United States Patent
Arai et al.

(10) Patent No.: US 7,875,371 B2
(45) Date of Patent: Jan. 25, 2011

(54) PERPENDICULAR MAGNETIC RECORDING MEDIUM, MANUFACTURING PROCESS OF THE SAME, AND MAGNETIC RECORDING/REPRODUCING APPARATUS USING THE SAME

(75) Inventors: Reiko Arai, Kanagawa (JP); Kiwamu Tanahashi, Tokyo (JP); Yoshinori Honda, Kanagawa (JP); Mineaki Kodama, Kanagawa (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 976 days.

(21) Appl. No.: 11/107,588

(22) Filed: Apr. 15, 2005

(65) Prior Publication Data
US 2005/0244679 A1 Nov. 3, 2005

(30) Foreign Application Priority Data
Apr. 15, 2004 (JP) .............................. 2004-120754

(51) Int. Cl.
*G11B 5/667* (2006.01)
*G11B 5/738* (2006.01)

(52) U.S. Cl. .................. 428/831.2; 428/828.1; 360/135
(58) Field of Classification Search ........................ None
See application file for complete search history.

(56) References Cited

U.S. PATENT DOCUMENTS

| | | | |
|---|---|---|---|
| 6,316,097 B1 * | 11/2001 | Liu et al. ..................... 428/332 |
| 6,641,935 B1 * | 11/2003 | Li et al. ..................... 428/828.1 |
| 6,660,357 B1 * | 12/2003 | Litvinov et al. ............. 428/827 |
| 6,855,439 B1 * | 2/2005 | Rou et al. ................. 428/832.2 |
| 6,942,936 B2 * | 9/2005 | Oikawa et al. ........... 428/828.1 |
| 7,153,596 B2 * | 12/2006 | Tanahashi et al. ........... 428/829 |
| 7,166,375 B2 * | 1/2007 | Shimizu et al. .......... 428/828.1 |
| 7,217,467 B2 * | 5/2007 | Arai et al. ................. 428/828.1 |
| 7,241,516 B1 * | 7/2007 | Acharya et al. .......... 428/828.1 |
| 7,666,530 B2 * | 2/2010 | Arai et al. ..................... 428/831 |
| 2002/0028357 A1 | 3/2002 | Shukh et al. |
| 2003/0022023 A1 * | 1/2003 | Carey et al. .......... 428/694 MM |
| 2003/0035973 A1 * | 2/2003 | Trindade et al. ............. 428/494 |
| 2003/0064253 A1 * | 4/2003 | Uwazumi et al. ....... 428/694 TP |
| 2003/0099868 A1 * | 5/2003 | Tanahashi et al. ...... 428/694 TM |
| 2004/0234818 A1 | 11/2004 | Tanahashi et al. |
| 2005/0019608 A1 * | 1/2005 | Kim et al. ............. 428/694 BS |

FOREIGN PATENT DOCUMENTS

| | | |
|---|---|---|
| JP | 06-103553 A | 4/1994 |
| JP | 07-129946 A | 5/1995 |
| JP | 11-191217 A | 7/1999 |
| JP | 2001-155322 A | 6/2001 |
| JP | 2002-298326 | 10/2002 |

* cited by examiner

*Primary Examiner*—Kevin M Bernatz
(74) *Attorney, Agent, or Firm*—Zilka-Kotab, PC

(57) ABSTRACT

Embodiments of the invention provide a perpendicular magnetic recording medium improved for fly ability, high in read signal quality, and capable of suppressing magnetic decay of recorded magnetization to be caused by stray fields. In one embodiment, a perpendicular recording layer is formed over a substrate with a soft magnetic underlayer therebetween, then an amorphous or nano-crystalline layer is formed between the substrate and the soft magnetic underlayer. The soft magnetic underlayer includes first and second amorphous soft magnetic layers, as well as a nonmagnetic layer formed between those first and second amorphous soft magnetic layers. The first and second amorphous soft magnetic layers are given uniaxial anisotropy in the radial direction of the substrate respectively and coupled with each other antiferromagnetically.

10 Claims, 14 Drawing Sheets

Medium A
(This invention)

Medium W
(Reference)

Medium A
(This invention)

Medium V
(Reference)

AL : amorphous layer, SL : soft magnetic layer, NL : non-magnetic layer
IML : intermediate layer RL, : recording layer, OCL : overcoat layer Medium A     Medium G     Medium H Medium K    Medium X    Medium Y (a) glass substrate    (b) NiTaZr

PERPENDICULAR MAGNETIC RECORDING MEDIUM, MANUFACTURING PROCESS OF THE SAME, AND MAGNETIC RECORDING/REPRODUCING APPARATUS USING THE SAME

CROSS-REFERENCES TO RELATED APPLICATIONS

This application claims priority from Japanese Patent Application No. JP2004-120754, filed Apr. 15, 2004, the entire disclosure of which is incorporated herein by reference.

BACKGROUND OF THE INVENTION

The present invention relates to a magnetic recording medium and a magnetic recording/reproducing apparatus, particularly to a perpendicular magnetic recording medium having high recording density and a method for manufacturing the same, as well as a magnetic recording/reproducing apparatus that uses the same.

In recent years, the areal recording density of respective magnetic disk drives is being expanded by 100% annually. As the areal recording density is increased such way, however, a problem, so-called thermal decay of magnetization, has come to appear. This is why the conventional longitudinal magnetic recording is considered to be difficult to achieve the areal recording density over 7.75 gigabits.

On the other hand, unlike the conventional longitudinal magnetic recording, the perpendicular recording is characteristic in that the demagnetizing field that works between adjacent bits decreases in proportion to an increase of the linear recording density, whereby the recorded magnetization is stabilized. In addition, because a soft magnetic underlayer having high magnetic permeability is provided under the subject perpendicular recording layer to obtain a strong recording magnetic field, the coercivity of the perpendicular recording layer can be increased. Consequently, the perpendicular recording is now under examination as a recording method expected to overstep the limit of the thermal fluctuation of the conventional longitudinal recording.

One of the effective methods for realizing such high density recording with use of the perpendicular recording method is combining a double-layer perpendicular recording medium consisting of a soft magnetic underlayer and a perpendicular recording layer with a single pole type head. However, the double-layer perpendicular recording medium has been confronted with a problem; the medium includes a soft magnetic underlayer having high saturation flux density (Bs) and therefore, the following three points (1) to (3) are required to be improved to solve the problem. (1) The leakage magnetic flux from the magnetic domain wall of the soft magnetic layer is observed as spike noise. (2) The magnetic domain wall of the soft magnetic underlayer moves, whereby decay of magnetization occurs in the recorded magnetization. (3) Stray fields in the apparatus are concentrated at the recording head, whereby decay of magnetization occurs in the recorded magnetization just under the recording head.

Furthermore, because the soft magnetic underlayer is as thick as several tens of nanometers to several hundreds of nanometers, the surface smoothness of the underlayer is lost and this might affect the forming of the perpendicular recording layer and the fly ability of the recording head adversely.

One of the methods proposed for solving such a problem is, as disclosed in the official gazettes of JP-A Nos. 129946/1995 and 191217/1999, to provide a hard magnetic pinning layer between the soft magnetic layer and the substrate and orient the magnetization of the underlayer in one direction. The official gazette of JP-A No. 103553/1994 also proposes a method for suppressing the domain wall motion of the soft magnetic underlayer through exchange coupling with the anti-ferromagnetic in which magnetic spinning is oriented in one direction. In addition, the official gazette of JP-A No. 155321/2001 discloses another method, which reverses the orientation of the magnetization of the soft magnetic layer by forming the soft magnetic layer with two or more layers separated by a nonmagnetic layer respectively.

BRIEF SUMMARY OF THE INVENTION

However, the method for providing the hard magnetic pinning layer might cause a problem; a magnetic domain is easily formed at the inner and outer edges of the subject disk respectively and spike noise is observed around those edges. On the other hand, the method for using the anti-ferromagnetic layer to suppress the domain wall motion of the soft magnetic layer is effective to suppress the decay of magnetization to be caused by the domain wall motion in the recorded magnetization, but it might not suppress the spike noise to be caused by the domain wall. Further, the method for reversing the magnetization of the laminated soft magnetic layer is effective to suppress the spike noise and the decay of magnetization in the recorded magnetization, and improve the stray field robustness. However, the method is apt to enable each layer to take a multi-domain structure if the substrate is a disk-shaped one, so that modulation might be observed in output signals. Any of those methods cannot solve the above problems that obstruct achievement of the surface smoothness of the soft magnetic underlayer, the fly ability of the recording head, etc.

Under such circumstances, it is a feature of the present invention to provide a perpendicular magnetic recording medium capable of suppressing the decay of magnetization in recorded magnetization caused by reproducing output fluctuation and stray magnetic fields to improve the surface flatness of the soft magnetic underlayer and realize excellent fly ability of the recording head and a high medium S/N ratio at 7.75 gigabits per square centimeter. It is another feature of the present invention to provide a highly reliable high density magnetic recording/reproducing apparatus that uses the medium.

In one aspect, the perpendicular magnetic recording medium of the present invention is structured so that a perpendicular recording layer is formed over a substrate with a soft magnetic underlayer therebetween and an amorphous layer or nano-crystalline layer is formed between the substrate and the soft magnetic underlayer while the soft magnetic underlayer includes first and second amorphous soft magnetic layers and a nonmagnetic layer formed between the first and second amorphous soft magnetic layers. The first and second amorphous soft magnetic layers are given uniaxial anisotropy respectively and coupled with each other antiferromagnetically. The magnetic recording/reproducing apparatus of the present invention uses the perpendicular magnetic recording medium.

In the above medium, the magnetization of the soft magnetic underlayer is controlled and the underlayer is formed on an amorphous layer or nano-crystalline layer, thereby suppressing the decay of magnetization in recorded magnetization to be caused by the output signal fluctuation and the stray field so as to improve the fly ability of the recording head.

The method for manufacturing the perpendicular magnetic recording medium according to one embodiment of the present invention comprises forming an amorphous layer or nano-crystalline layer over a substrate, forming a first amorphous soft magnetic layer on the amorphous layer or nano-crystalline layer, forming a nonmagnetic layer on the first amorphous soft magnetic layer, forming a second amorphous soft magnetic layer on a nonmagnetic layer, and forming a perpendicular recording layer on the second amorphous soft magnetic layer. The method may further comprise cooling the substrate while applying a magnetic field to the substrate in its radial direction after at least any of the step of forming the first amorphous soft magnetic layer and the step of forming the second amorphous soft magnetic layer. Cooling the substrate can give uniaxial anisotropy surely in the radial direction of the disk substrate.

According to the present invention, therefore, it is possible to realize a perpendicular magnetic recording medium capable of suppressing both spike noise and amplitude modulation of output signals, as well as the decay of recorded magnetization to be caused by stray fields, and realizing excellent fly ability of the recording head. In addition, it is possible to realize a highly reliable and stable magnetic recording/reproducing apparatus having a low error rate at 7.75 gigabits or over per square centimeter.

DETAILED DESCRIPTION OF THE INVENTION

Figure 1:
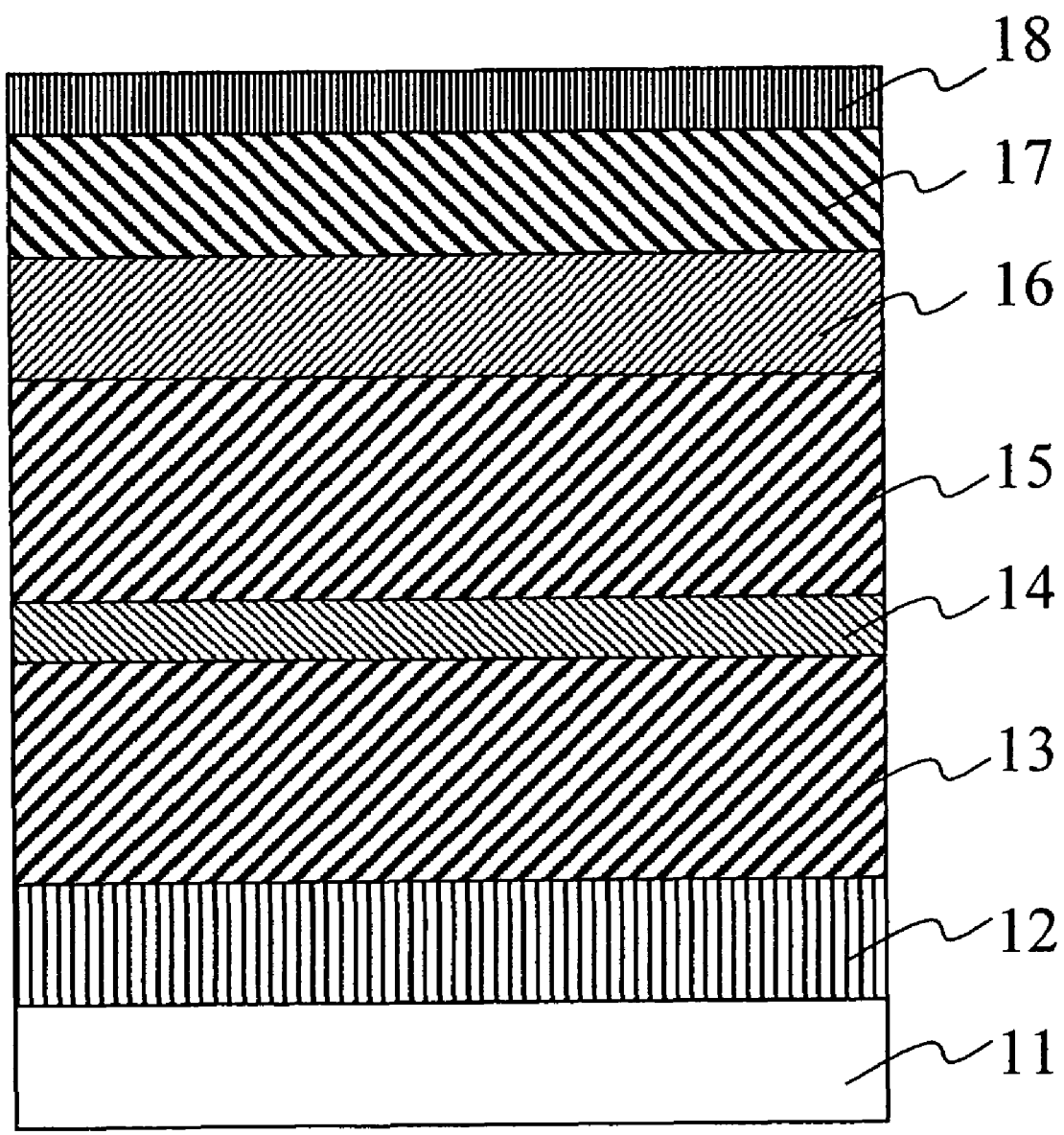
FIG. 1 is a layer configuration of a perpendicular recording medium in an embodiment of the present invention.

Hereunder, the perpendicular magnetic recording medium of the present invention will be described in detail with reference to the accompanying drawings.

The perpendicular magnetic recording medium according to embodiments of the present invention is structured so that an amorphous layer or nano-crystalline layer is formed over the substrate, a soft magnetic underlayer is formed on the amorphous layer or nano-crystalline layer, and a perpendicular recording layer is formed on the soft magnetic underlayer. This soft magnetic underlayer includes first and second amorphous soft magnetic layers and a nonmagnetic layer formed between the first and second amorphous soft magnetic layers. The first and second amorphous soft magnetic layers are given uniaxial anisotropy in the radial direction of the disk substrate respectively and coupled with each other antiferromagnetically.

Then, a magnetic field is applied to the substrate of the perpendicular magnetic recording medium in its radial direction to measure the magnetization curve of the soft magnetic underlayer and the magnetization curve is found to have a step-like shape having a magnetization level stable within a magnetic field that includes the zero field. The absolute value of the switching field of which state is switched from negative field side saturation magnetization to the stable magnetization level is almost the same as the absolute value of the switching field of which state is switched from positive field side saturation magnetization to the stable magnetic level.

Furthermore, in the magnetization curve of the soft magnetic underlayer measured by applying a magnetic field in the radial direction of the substrate of the perpendicular magnetic recording medium, the differential value of the magnetization curve of the soft magnetic layer assumed when the state of the applied magnetic field is changed from saturation magnetization to its reversed saturation magnetization comes to have two peaks. The two peaks are almost symmetrical about the zero field. The peak of the differential value of the magnetization curve assumed when the state of the applied magnetic field is changed from positive or negative saturation magnetization to zero comes to almost lie upon the peak of the differential value of the magnetization curve assumed when the state of the applied magnetic field is changed from zero to positive or negative saturation magnetization.

Each of the first and second amorphous soft magnetic layers may be formed with any material if the material is given uniaxial anisotropy in the radial direction of the substrate when the value of Bs becomes at least over 1 Tesla, satisfies the coercivity measured in the head running direction, which is under 1.6 kA/m, and is excellent in surface flatness properties.

Concretely, the medium will have the above characteristics easily if the medium is made of an amorphous alloy containing mainly Co or Fe and such additives as Ta, Hf, Nb, Zr, Si, B, C, etc. The film thickness should be over about 20 nm so that the coercivity is controlled low. If the film thickness is under about 150 nm, the medium will be able to suppress spike noise and improve the stray field robustness.

The magnetic moment should be equal between the first and second amorphous soft magnetic layers so that a magnetic flux flows between those layers, whereby the magnetic domains in the layers are more stabilized.

The amorphous layer or nano-crystalline layer may be formed with any material if the material is excellent in surface flatness properties. However, the layer should preferably be formed with an alloy containing at least two or more types of Ni, Al, Ti, Ta, Cr, Zr, Co, Hf, Si, and B metal elements. More concretely, the layer may be formed with NiTa, AlTi, AlTa, CrTi, CoTi, NiTaZr, NiCrZr, CrTiAl, or the like. Using any of those materials will improve both stress relaxation, scratch resistance, and corrosion resistance.

The amorphous layer or nano-crystalline layer should preferably be about 1 nm to 100 nm in thickness. If the amorphous layer or nano-crystalline layer is under about 1 nm in thickness, it might not compensate the surface roughness of the disk substrate. If the amorphous layer or nano-crystalline layer is over about 100 nm in thickness, the substrate temperature might rise when in film deposition, whereby the first amorphous soft magnetic layer to be formed on the amorphous layer or nano-crystalline layer might be crystallized, and the medium characteristics are lowered.

As described above, the perpendicular magnetic recording medium according to embodiments of the present invention can promote the stress relaxation of the amorphous soft magnetic layer and reduce the distortion of the substrate, so that the medium comes to have excellent fly ability. Although the first and second amorphous soft magnetic layers come to have a multi-magnetic domain structure respectively, both spike noise and output signal amplitude modulation are suppressed, whereby the reliability of the medium is further improved.

Figure 19:
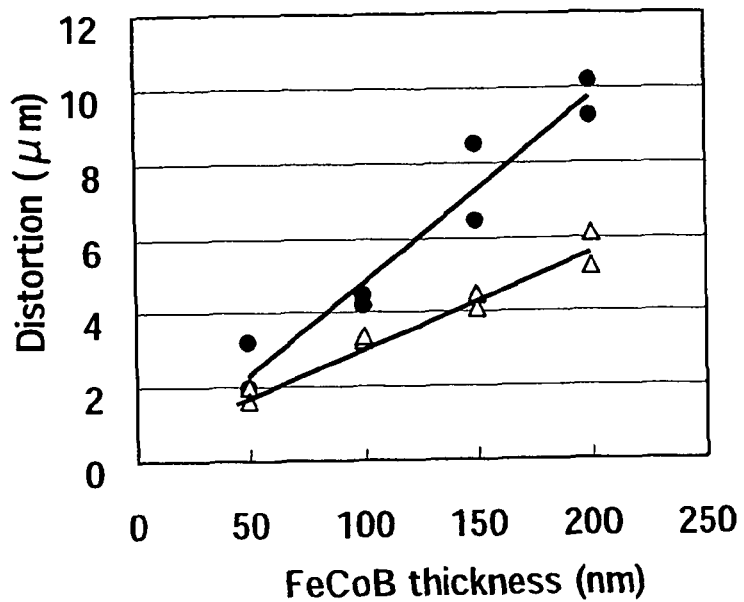
FIG. 19 is a graph for describing a relationship between the FeCoB film thickness and the distortion of the glass substrate.

FIG. 19 shows a result of comparison of the substrate distortion between when an amorphous soft magnetic layer (FeCoB) is formed directly on the glass substrate and when the amorphous soft magnetic layer (FeCoB) is formed over the glass substrate with an amorphous layer (NiTaZr) therebetween at a thickness of 50 to 200 nm respectively.

It would be understood from FIG. 19 that the substrate distortion increases in proportion to an increase of the thickness of the FeCoB layer. If the FeCoB layer is formed over the glass substrate with an amorphous layer therebetween, the substrate distortion is reduced to a half of that when the FeCoB layer is formed directly on the glass substrate.

Figure 20:
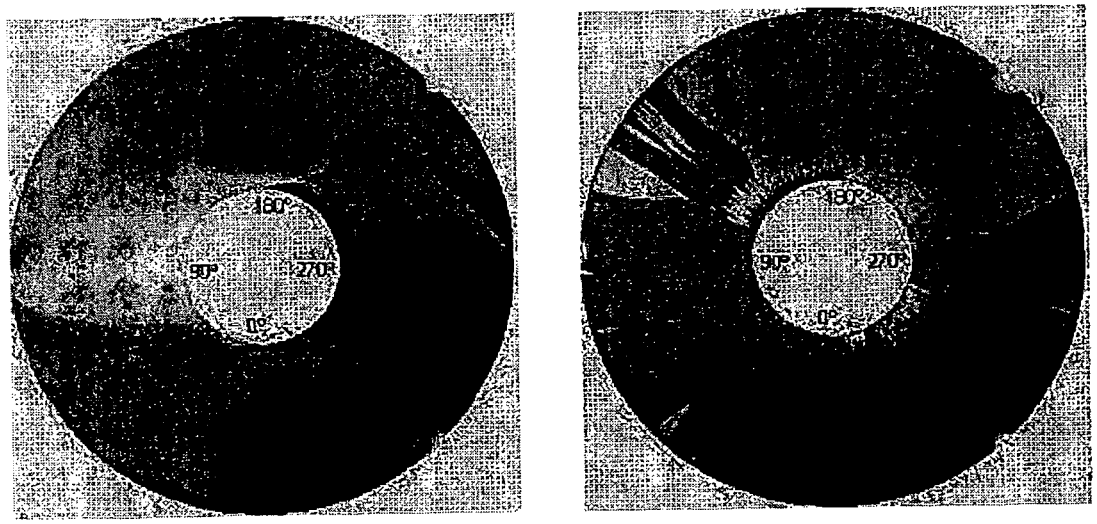
FIG. 20 is a magnetic domain structure of a soft magnetic layer.

FIG. 20 shows a result of observation of the magnetic domain structure of the FeCoB layer through an optical surface analyzer when the FeCoB layer is formed at a thickness of 200 nm.

If the FeCoB layer is formed directly on the glass substrate, the domain image appears as shown in FIG. 20(a). On the other hand, if the FeCoB layer is formed over the glass substrate with an NiTaZr layer therebetween, the domain structure comes to have a magnetic wall extended in the radial direction of the substrate as shown in FIG. 20(b).

Such a material as FeCoB having a large film stress causes the coercivity to increase when it is deposited directly on the substrate, so that the uniaxial anisotropy is reduced. If the material is deposited on an NiTaZr layer, however, the film stress is relaxed; whereby the layer is given uniaxial anisotropy in the radial direction of the substrate regardless of the FeCoB film thickness.

Consequently, because the amorphous soft magnetic layer is formed over the glass substrate with an amorphous layer therebetween, the film stress is relaxed and the soft magnetic characteristic is improved clearly. The same effect is also obtained if the amorphous soft magnetic layer is formed with a material containing at least two types of Ni, Al, Ti, Ta, Cr, Zr, Co, Hf, Si, and B metal elements, concretely with any of NiTa, AlTi, AlTa, CrTi, CoTi, NiCrZr, CrTiAl, etc.

The amorphous layer formed between the first and second amorphous soft magnetic layers functions to enable the first and second amorphous soft magnetic layers to be coupled with each other antiferromagnetically. Ru or Cu should preferably be used when an amorphous alloy containing Co mainly is used to form the both soft magnetic layers while Cr or Ru should preferably be used when an amorphous alloy containing Fe mainly is used to form the both soft magnetic layers.

The thickness of the nonmagnetic layer is just required to be set so as to enable anti-ferromagnetic coupling between the both soft magnetic layers. However, the optimal thickness depends on various conditions such as the material of the both soft magnetic layers, the depositing condition, and the substrate temperature when in film deposition. For example, if an amorphous alloy containing mainly Co is used to form the both soft magnetic layers and Ru is used to form the nonmagnetic layer, the Ru layer should preferably be set around 0.5 to 1.5 nm in thickness.

It is effective to take a sandwich structure in which the nonmagnetic layer is put between thin ferromagnetic layers having a thickness of about 1 to 5 nm respectively to make it stronger the anti-ferromagnetic coupling between the first and second amorphous soft magnetic layers. Concretely, for example, a laminated layer consisting of three layers of Co/Ru/Co, CoFe/Ru/CoFe, Fe/Cr/Fe, or the like may be used. An alloy of non-material and ferromagnetic layers may also be used for the non-material layer to obtain the same effect. Concretely, for example, RuCo, RuFe, or the like may be used.

Furthermore, the disk substrate is cooled enough after the first amorphous soft magnetic layer is formed so as to form the nonmagnetic film, thereby enabling the antiferromagnetic coupling between the soft magnetic layer and the nonmagnetic layer to function more stably.

While the substrate is cooled, a magnetic field should preferably be applied in the radial direction of the substrate. At that time, the magnetization of the first amorphous soft magnetic layer in the radial direction must be saturated and it is just required to apply a magnetic field in the radial direction of the disk substrate so that the magnetic field magnitude becomes 4 kA/m and over. This cooling process carried out in the magnetic field can give uniaxial anisotropy to the first amorphous soft magnetic layer more surely.

The cooling temperature is lowered down to, for example, about 100° C., which is lower than the temperature in the process of forming the first amorphous soft magnetic layer, then preferably the temperature is lowered down to the room temperature. This cooling process can thus make the antiferromagnetic coupling between the soft magnetic layer and the nonmagnetic layer to function stably.

In addition, the substrate cooling process may be provided after the second amorphous soft magnetic layer deposition process. In that connection, the process should be controlled so that the substrate temperature is prevented from rising after the first amorphous soft magnetic layer is formed.

Furthermore, the substrate cooling process may be provided at two places after the first and second amorphous soft magnetic layers deposition processes. In that connection, the uniaxial anisotropy is given more surely to the first and second amorphous soft magnetic layers respectively.

The substrate cooling should preferably be provided before the nonmagnetic layer deposition process. This is because the nonmagnetic layer is so thin and interfacial diffusion might occur depending on the combination of materials, the film thickness, or the depositing condition when in depositing of the nonmagnetic layer, as well as because the interface between the first and second amorphous soft magnetic layers is crystallized, whereby the antiferromagnetic coupling might be disabled. Particularly, if the disk temperature is very high before the amorphous layer is formed, much care should be given to those points.

If the cooling process is provided after the deposition processes of the first and second amorphous soft magnetic layers, the nonmagnetic layer may be formed as a three-layer film of Co/Ru/Co, or the like or as an alloy layer of RuCo, or the like. Consequently, the interfacial diffusion of the nonmagnetic layer is suppressed enough, whereby desired characteristics are obtained.

Furthermore, an intermediate layer should preferably be formed between the perpendicular recording layer and the soft magnetic underlayer so that medium noise is suppressed. The intermediate layer may be formed with an alloy structured as amorphous or hexagonal closed packed structure or face-center cubic structure. The intermediate layer may also be formed as a single-layer film or laminated layer formed with different crystal structure materials.

The perpendicular recording layer may be formed with such a hcp-Co alloy film as a CoCrPt alloy, a CoCrPtB alloy, or the like, such a granular film as a CoCrPt—$SiO_2$ or the like, a superlattice film such as a (Co/Pd) multilayer film, a (CoB/Pd) multilayer film, a (CoSi/Pd) multilayer film, a Co/Pt multilayer film, a (CoB/Pt) multilayer film, a (CoSi/Pt) multilayer film, or the like.

The protective layer of the perpendicular recording layer should preferably be formed as a laminated layer consisting of a film containing carbon mainly and having a thickness of about 2 nm to 8 nm and such a lubricant layer as a perfluoro alkyl poly-ethere or the like. As a result, the reliability of the perpendicular magnetic recording medium is further improved.

The magnetic recording/reproducing apparatus according to an embodiment of the present invention comprises a perpendicular magnetic recording medium described above, a driving element for driving the medium in the recording direction, a magnetic head including a write element and a read element, a mechanism for moving the magnetic head relatively with respect to the perpendicular magnetic recording medium, and a write/read channel for writing/reading signals to/from the magnetic head. The read element of the magnetic head is composed of a single pole type head and the read element of the magnetic head is composed of a high sensitive element that employs magnetoresistance or tunneling magneto-resistance. Consequently, the present invention comes to realize a highly reliable magnetic recording/reproducing apparatus having areal recording density as high as 7.75 gigabits per square centimeter.

Hereinafter, the embodiments of the present invention will be described in detail with reference to the accompanying drawings.

First Embodiment

FIG. 1 shows a structure of a perpendicular magnetic recording medium in this first embodiment. On a 2.5-inch glass disk substrate 11 were formed an amorphous layer 12, a first amorphous soft magnetic layer 13, a nonmagnetic layer 14, a second amorphous soft magnetic layer 15, an intermediate layer 16, a perpendicular recording layer 17, and a protective layer 18 successively with use of a sputtering method. Table 1 shows the target, the Ar gas pressure, and the film thickness of each layer of the medium.

TABLE 1

|  | Target composition | Ar gas pressure (Pa) | Film thickness (nm) |
| --- | --- | --- | --- |
| Amorphous layer 12 | $Ni_{52.5}Ta_{37.5}Zr_{10}$ | 1 | 30 |
| First amorphous soft magnetic layer 13 | $Co_{92}Ta_3Zr_5$ $Fe_{57}Co_{31}B_{12}$ | 0.5 0.5 | 50-100 100 |
| Nonmagnetic layer 14 | Ru | 0.6 | 0.8 |
| Second amorphous soft magnetic layer 15 | $Co_{92}Ta_3Zr_5$ $Fe_{57}Co_{31}B_{12}$ | 0.5 0.5 | 50-100 100 |
| Intermediate layer 16 | Ru | 2 | 20 |
| Perpendicular recording layer 17 | $CoCr_{13}Pt_{14}$—$SiO_2$ | 2 | 20 |
| Protective layer 18 | Carbon | 1 | 5 |

At first, NiTaZr to form the amorphous layer 12 and CoTaZr or FeCoB to form the first amorphous soft magnetic layer 13 were deposited on the substrate 11 successively. After that, the substrate 11 was cooled down to about 80° C. in the magnetic field with use of helium gas to deposit Ru to form the nonmagnetic layer 14 and CoTaZr or FeCoB to form the second amorphous soft magnetic layer 15. The substrate 11 was then cooled down to 80° C. with use of the helium gas to deposit Ru to form the intermediate layer 16 and CoCrPt—$SiO_2$ to form the recording layer 17 successively. After that, carbon was deposited to form the protective layer 18. The magnitude of magnetic field in the cooling process was 4 kA/m. After that, lubricant consisting of perfluoro alkyl poly-ethere thinned with perfluoro alkyl poly-ether was coated. Thus, the perpendicular magnetic recording medium in this first embodiment was completed.

Figure 2:
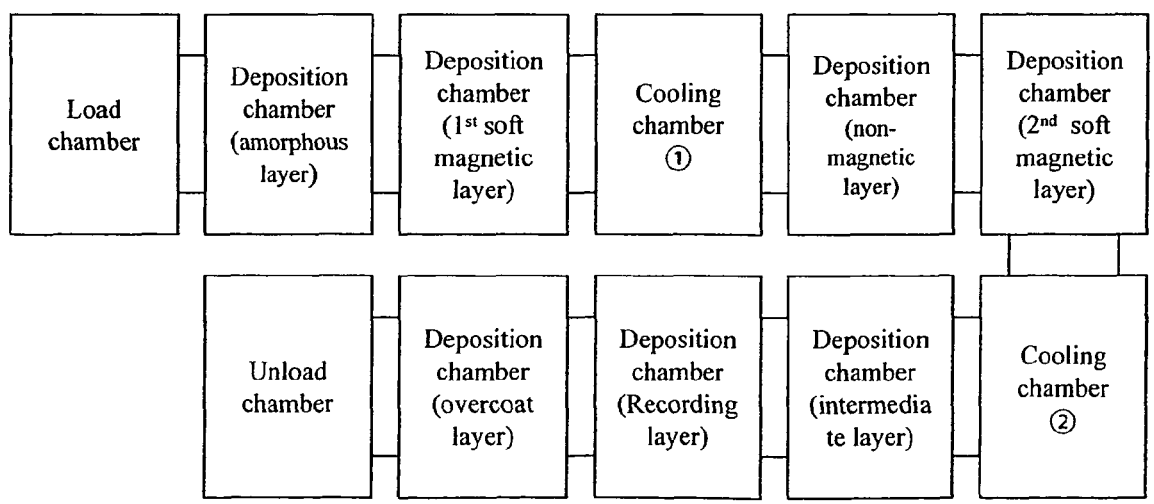
FIG. 2 is a schematic block diagram of a film depositing apparatus for manufacturing a medium in an embodiment of the present invention.

FIG. 2 shows a schematic block diagram of a film depositing apparatus for manufacturing the medium in the first embodiment. The depositing apparatus comprises a substrate load chamber, an amorphous layer deposition chamber, a first amorphous soft magnetic layer deposition chamber, a first substrate cooling chamber while applying a magnetic field in the radial direction of the substrate, a nonmagnetic layer deposition chamber, a second amorphous soft magnetic layer deposition chamber, a second substrate cooling chamber while applying a magnetic field in the radial direction of the substrate, an intermediate layer deposition chamber, and a recording layer deposition chamber, a protective layer deposition chamber, and a substrate unload chamber.

Two media V and W are prepared for comparison. In the medium V, NiTaZr is deposited to form the amorphous layer between the first and second amorphous soft magnetic layers. In the medium W, FeAlSi is deposited to form the soft magnetic layer. Other layers are formed in the same way as those of the medium in this first embodiment.

FIG. 3(a) shows a magnetization curve of the soft magnetic underlayer in this first embodiment, which was measured by a vibrating sample magnetometer (VSM).

The magnetization curve measured by applying a magnetic field in the radial direction of the substrate in this first embodiment has a step-like shape having a magnetization level (the first and second amorphous soft magnetic layers are magnetized in anti-parallel to each other: II) stable within a magnetic field range that includes the zero field. In addition, the absolute value of the switching field of which state is switched from negative field saturation magnetization (I) to the stable magnetization level is almost the same as the absolute value of the switching field of which level is switched from the positive field saturation level (III) to the stable magnetization level.

The magnetization curve measured by applying a magnetic field in the radial direction of the substrate denotes that both magnetic field and magnetizing direction change almost linearly.

FIG. 3(b) shows a result of differentiation of the magnetization curve (a) measured by applying a magnetic field in the radial direction of the substrate with respect to the magnetic field. This differential value has four peaks that appear when the applied magnetic field changes from positive to negative and from negative to positive. The two peaks recognized when the applied magnetic field is changed from positive saturation magnetization level to zero and from zero to the positive saturation magnetization level almost lie one upon another and those two peaks and other two peaks recognized when the applied magnetization level is changed from the negative saturation magnetization to zero and from zero to the negative saturation magnetization are almost symmetrical about the magnetic field zero.

In a soft magnetic underlayer having a differential curve as shown in FIG. 3(b), the first and second amorphous soft magnetic layers are given uniaxial anisotropy respectively in the radial direction of the substrate and coupled with each other antiferromagnetically just as in this embodiment.

The center value of the absolute values of the two peaks recognized at the positive field side denotes a switching field (in which the magnetization level is switched and hereinafter, to be referred to as antiferromagnetic coupling magnetic field Hex) shown in FIG. 3(a).

In the range in which these two peaks appear, the first and second amorphous soft magnetic layers are coupled with each other antiferromagnetically, so that their magnetization state can be suppressed from changes to be caused by external magnetic fields.

Figure 4:
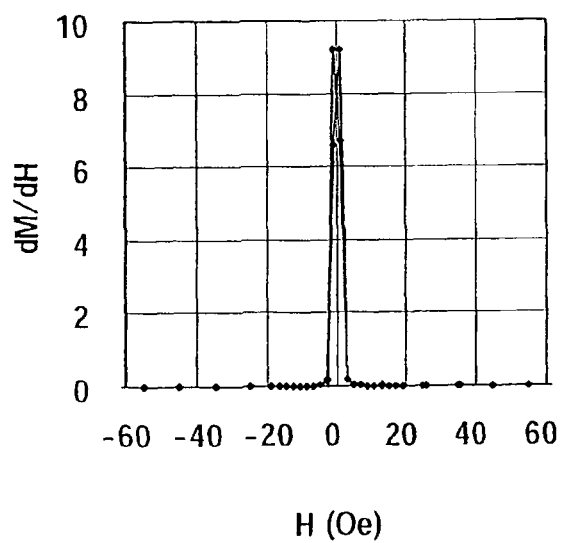
FIG. 4 is a graph for denoting a curve obtained by differentiating a magnetic curve measured by applying a magnetic field in the radial direction of the soft magnetic underlayer of the medium V in a comparative example by the magnetic field.
Figure 5:
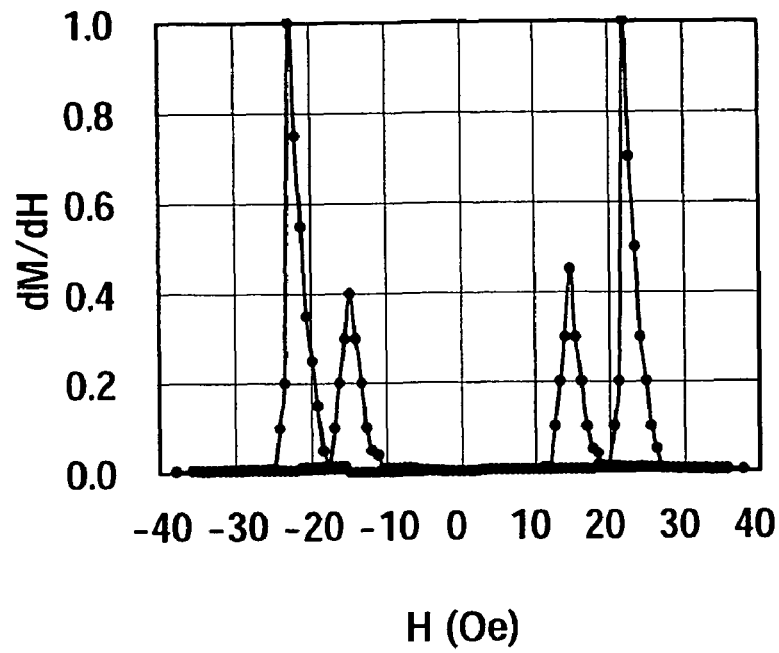
FIG. 5 is a graph for denoting a curve obtained by differentiating a magnetic curve measured by applying a magnetic field in the radial direction of the soft magnetic underlayer of the medium W in a comparative example by the magnetic field.

FIG. 4 shows a curve obtained by differentiating a magnetization curve of the medium V in a comparative example with respect to the magnetic field; and FIG. 5 shows a curve obtained by differentiating a magnetization curve of the medium W in a comparative example, measured by applying a magnetic field in the radial direction of the substrate with respect to the magnetic field.

Unlike the differential value in FIG. 3(b), the differential value in FIG. 4 enables one peak to be recognized around the zero field when the applied magnetic field level is changed from positive saturation magnetization to negative one. In a soft magnetic underlayer having such a curve, the first and second amorphous soft magnetic layers are not coupled with each other antiferromagnetically while they are given uniaxial anisotropy respectively. Their magnetization states thus come to be changed easily in response to a small external magnetic field.

Similarly to the medium in this first embodiment, the differential value shown in FIG. 5 has four peaks. The two peaks recognized at the positive or negative magnetic field side do not lie one upon another and they are not symmetrical about the field zero. In a soft magnetic underlayer having such a curve, the first and second amorphous soft magnetic layers are magnetized at random, that is, not in parallel to each other in the radial direction of the substrate while they are coupled with each other antiferromagnetically. In other words, each of the first and second amorphous soft magnetic layers is given no uniaxial anisotropy in the radial direction of the substrate. When compared with the medium A in this first embodiment, therefore, the medium comes to have a small Hex value and weak in stray field robustness.

Figure 3:
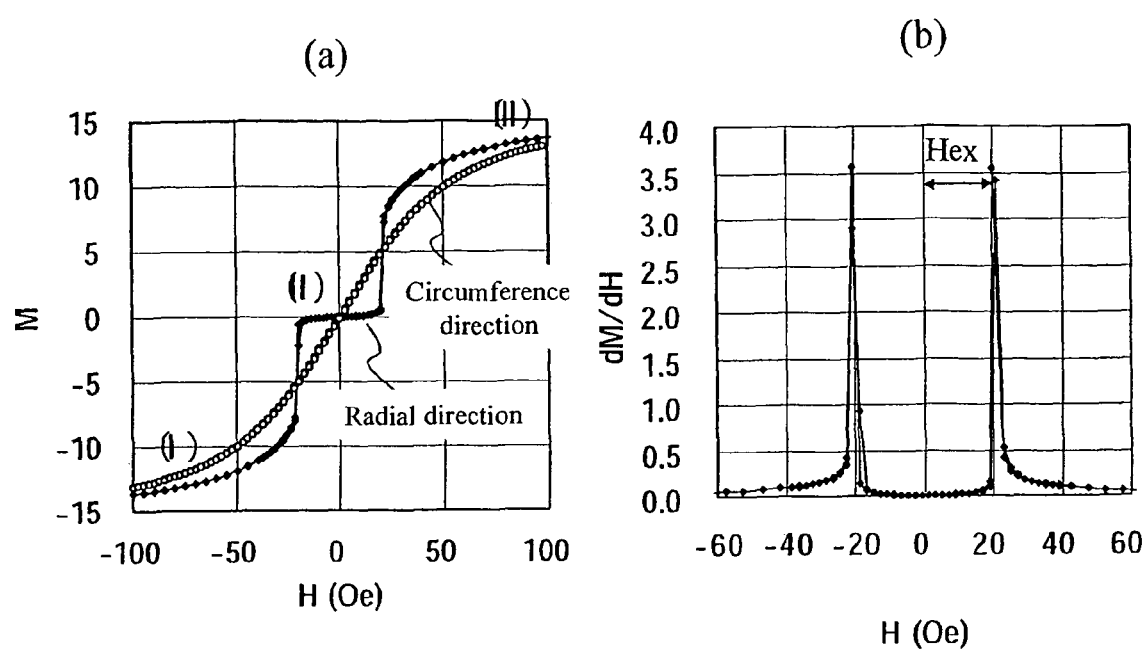
FIG. 3 is graphs for curves obtained by differentiating each of a magnetic curve of a soft magnetic underlayer of the medium A in an embodiment of the present invention and a magnetic curve measured by applying a magnetic field in the radial direction of the substrate (A) by the magnetic field.
Figure 6:
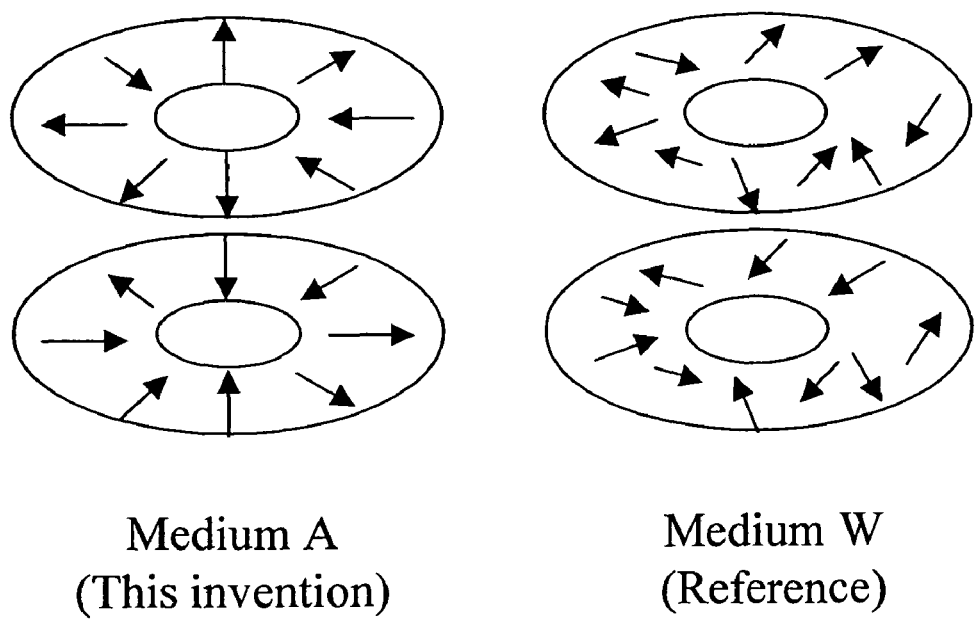
FIG. 6 is explanatory views of the magnetization of the magnetic underlayers of the medium A in an embodiment of the present invention and the medium W in a comparative example.

FIG. 6 shows an explanatory view of the state of the remanence of the second amorphous soft magnetic layer to be expected from the differential curve shown in FIG. 3 or 5.

The first amorphous soft magnetic layer 13 of the medium A in this embodiment is magnetized almost in parallel to the radial direction of the substrate and the second amorphous soft magnetic layer 15 is magnetized in anti-parallel to the first amorphous soft magnetic layer 13. However, because the first and second amorphous soft magnetic layers are not magnetized in one direction such way, the layers are considered to have a multi-domain structure respectively.

In the medium W in the comparative example, the first and second amorphous soft magnetic layers are magnetized in anti-parallel to each other, that is, magnetized at random. When compared with the medium A in this first embodiment, therefore, the medium is considered to have a more minute magnetic domain structure.

Figure 7:
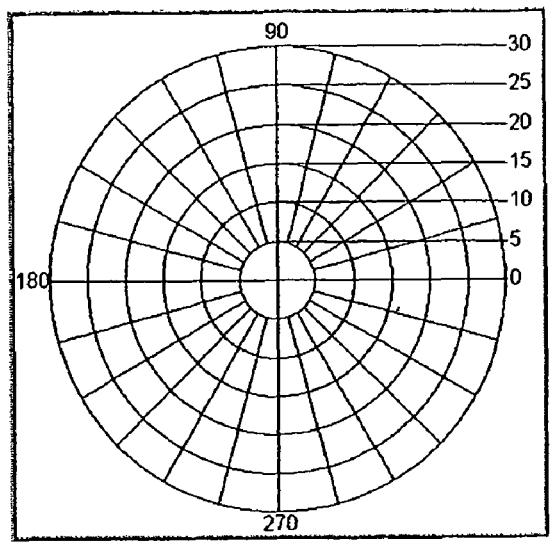
FIG. 7 illustrates how the spike noise is distributed in the medium A in an embodiment of the present invention, as well as in the medium V in a comparative example.
Figure 7:
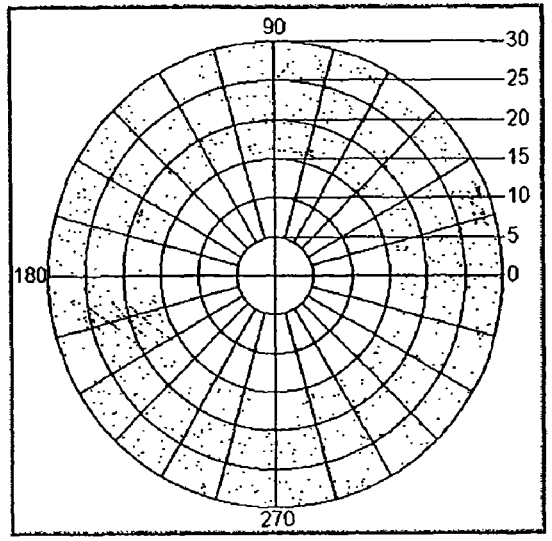

FIG. 7 shows spike noise maps of the medium A in this first embodiment and the medium V in the comparative example. In FIG. 7, a spin stand and a digital oscilloscope were used to evaluate a disk radius range of 16 to 30 mm at 100 μm pitches. In the medium V in the comparative example, two types of spike noise were observed; large spike noise possibly caused by the magnetic domain wall and spot-like distributed spike noise. In the medium A in this first embodiment, however, no distinct spike noise was recognized.

Although each of the first and second amorphous soft magnetic layers 13 and 15 has a multi-domain structure in the soft magnetic layer in this first embodiment as described above, the closure flux flows through those layers. Thus, the underlayer was found to be effective to suppress spike noise significantly.

Next, a description will be made for results of evaluation of the spike noise of the medium and the amplitude modulation of read signals examined in this first embodiment and tabulated in Table 2.

TABLE 2

| Medium | | Constitution of soft magnetic underlayer, parenthesized number means film thickness (unit: nm) | Hex (Oe) | Spike noise | Amplitude modulation |
|---|---|---|---|---|---|
| This embodiment | A | CoTaZr(100)/Ru(0.8)/CoTaZr(100) | 23 | Absent | Not made |
| | B | CoTaZr(75)/Ru(0.8)/CoTaZr(75) | 33 | Absent | Not made |
| | C | CoTaZr(50)/Ru(0.8)/CoTaZr(50) | 45 | Absent | Not made |
| | D | FeCoB(75)/Ru(0.8)/FeCoB(75) | 43 | Absent | Not made |
| Comparative example | V | CoTaZr(100)/NiTaZr(5)/CoTaZr(100) | 0 | Present | Made |
| | W | FeSiAl(100)/Cr(1)/FeSiAl(100) | 15 | Absent | Made |

In any of the media A to D in this embodiment and the medium W in the comparative example, no distinct spike noise was observed. This is because the first and second amorphous soft magnetic layers were coupled with each other antiferromagnetically, whereby those layers were magnetized in anti-parallel to each other. In the media V and W, however, read signal amplitude modulation was observed.

Figure 8:
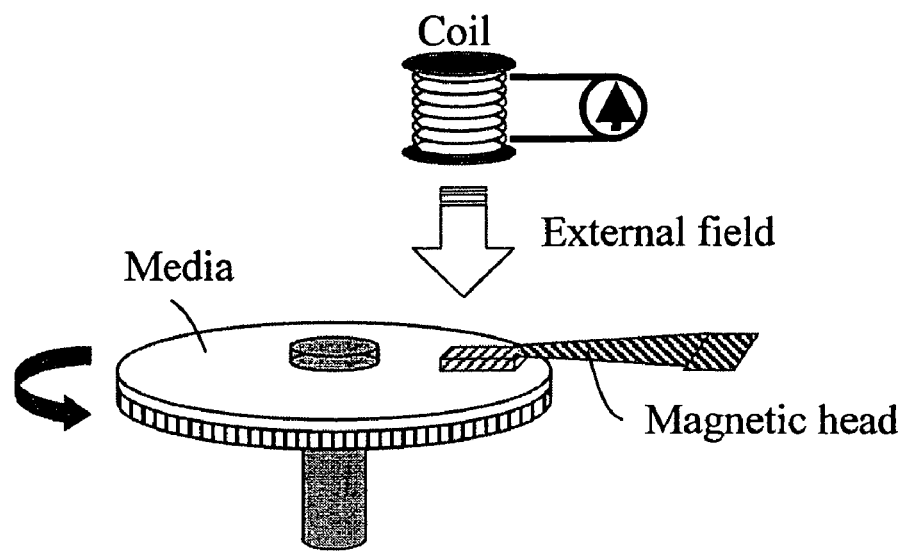
FIG. 8 is an explanatory view of a method for evaluating the stray field resistance.

Next, a description will be made for results of evaluation of the stray field resistance of the media A, V, and W. As shown in FIG. 8, a coil was disposed on each of the media and a current was flown in the coil to apply a magnetic field to the medium so as to check how reproducing output signals change in level with respect to the external magnetic field.

Figure 9:
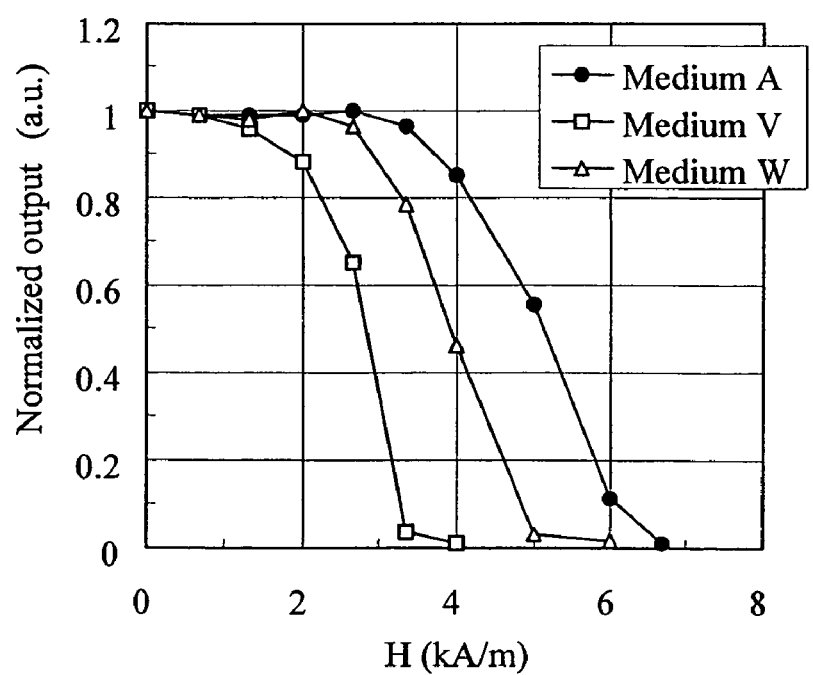
FIG. 9 is a graph for describing a relationship between an external magnetic field and a standardized read output.

FIG. 9 shows results of the evaluation. The external magnetic field of which output was lowered by 10% was as follows; 1.0 kA/m for the medium V (comparative example) and 2.2 kA/m for the medium W in which the first and second amorphous soft magnetic layers were coupled with each other antiferromagnetically. On the other hand, the external magnetic field output was about 4.0 kA/m for the medium A of the present invention. This proved that the external magnetic field resistance was improved.

In this first embodiment, the amorphous layer was formed with NiTaZr. However, it is already known that the same effect is also obtained even when the amorphous layer is formed with a material containing at least two or more types of Ni, Al, Ti, Ta, Cr, Zr, Co, Hf, Si, and B metal elements, concretely with any of NiTa, AlTi, AlTa, CrTi, CoTi, NiCrZr, CrTiAl, etc.

Because the first and second amorphous soft magnetic layers were magnetized in anti-parallel to each other and the magnetic moment was equal between those layers, whereby a magnetic flux flew between those layers in the soft magnetic underlayer of the present invention, the underlayer was found apparently to be effective significantly to suppress both spike noise and read signal amplitude modification. In addition, the underlayer was also found to be effective to give uniaxial anisotropy to the first and second amorphous soft magnetic layers in the radial direction of the substrate respectively to reduce the coercivity, thereby improving the stray magnetic field resistance.

Second Embodiment

In this second embodiment, a description will be made for a result of checking a relationship between the cooling timing and the antiferromagnetic coupling magnetic field magnitude Hex that works between the first and second amorphous soft magnetic layers using a medium manufactured just as the medium A in the first embodiment.

Figure 10:
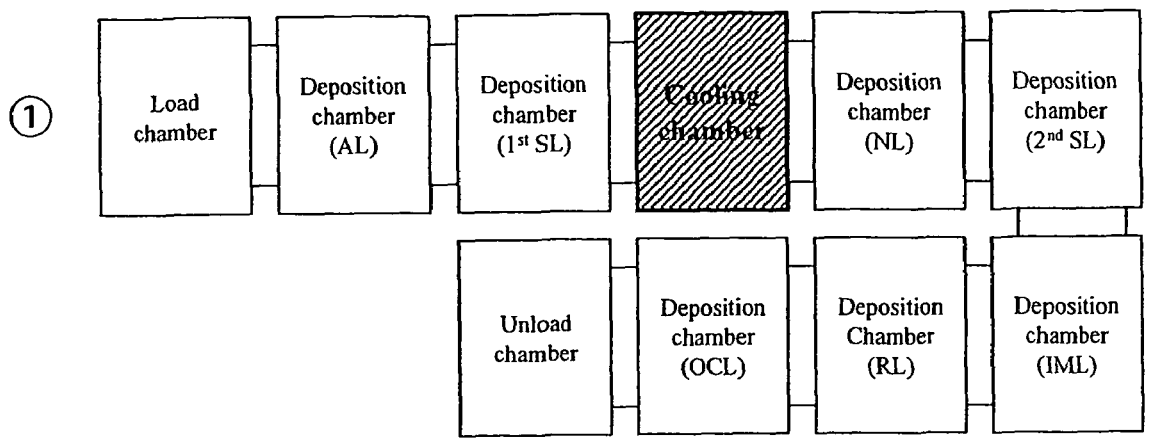
FIG. 10 is a timing of each cooling process for cooling the soft magnetic underlayer.
Figure 10:
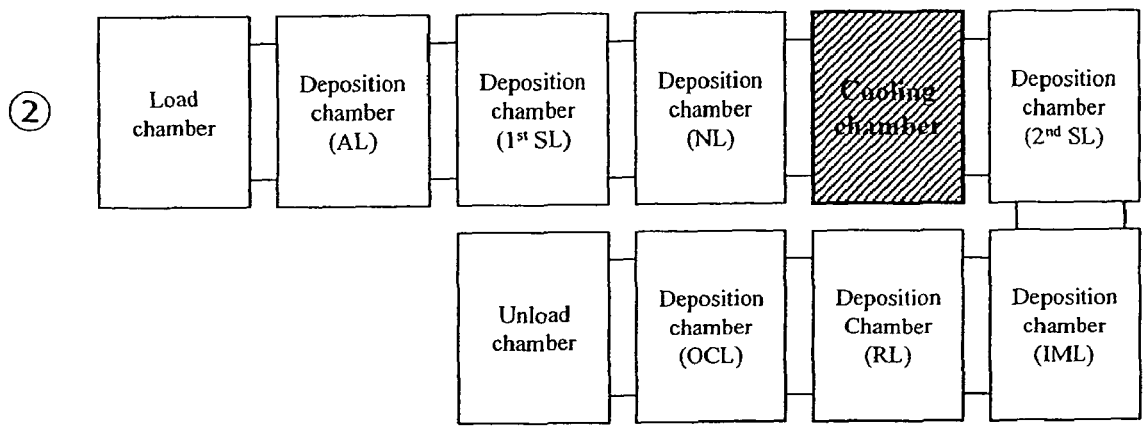
Figure 10:
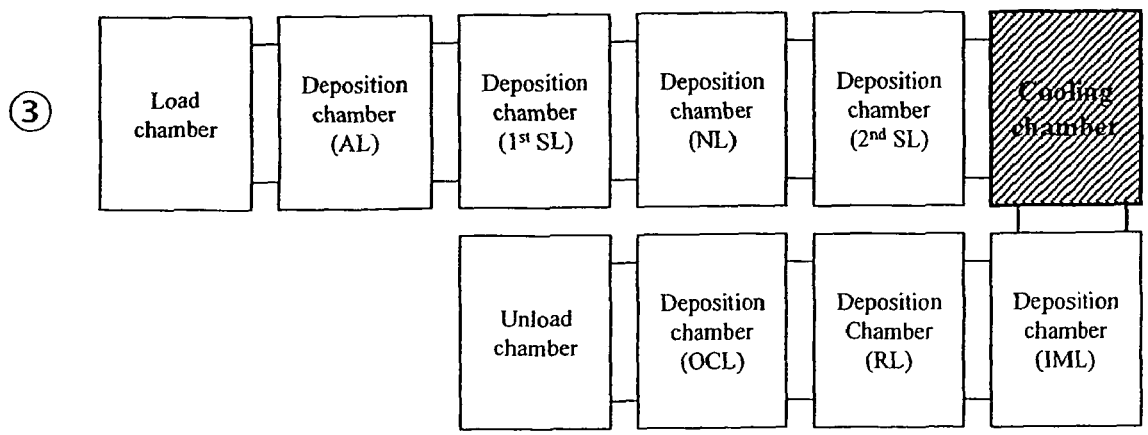

FIG. 10 shows a schematic block diagram of deposition processes for manufacturing the media used in this second embodiment and comparative examples.

The deposition process (1) is a process for manufacturing the medium A used in this second embodiment. A cooling process is provided between a process for forming the first amorphous soft magnetic layer 14 and a process for forming the nonmagnetic layer 14.

The deposition process (2) for manufacturing the medium in the comparative example includes a cooling process provided between the process for forming the nonmagnetic layer 14 and the process for forming the second amorphous soft magnetic layer 15.

The deposition process (3) includes a cooling process provided between the process for forming the second amorphous soft magnetic layer 15 and the process for forming the intermediate layer 16.

The cooling unit is composed of two copper-made cooling plates and a coil for applying a magnetic field to each object disk substrate. In this second embodiment, the temperature of the cooling plates was lowered to −100° C. or less and the substrate was cooled in the magnetic field for five seconds in an hydrogen or helium atmosphere at a pressure of about 200 Pa. In the cooling process, the magnetic field was applied in the radial direction of the disk substrate and the polarity of the magnetic field was adjusted to the polarity of the leak magnetic field from the DC magnetron sputtering cathode so that the magnetic field magnitude became within 4 kA/m to 8 kA/m on the disk substrate.

Table 3 shows results of evaluation of both spike noise and read signal amplitude modulation with respect to the media in this second embodiment and the comparative examples, as well as the average and variations of Hex values measured at 32 different places. In any of the medium A in this second embodiment and the media E and F in the comparative examples that were cooled in the magnetic field respectively, no distinct spike noise was observed regardless of the timing of the cooling process. However, in the medium G in the comparative example that was cooled without applying any magnetic field (in the nonmagnetic field) and the medium H that was not cooled at all, a lot of spike noise was observed and the read signal amplitude modulation was found to be significant.

TABLE 3

| Medium | Deposition process | Magnetic field | Spike Noise | Amplitude modulation | Hex (Oe) | Longitudinal variation |
|---|---|---|---|---|---|---|
| This embodiment | A | (1) | Present | Absent | Not made | 23 | 17% |
| Comparative example | E | (2) | Present | Absent | Made | 19.5 | 25% |
| | F | (3) | Present | Absent | Made | 15.2 | 100% |
| | G | (3) | Absent | Present | Made | 4.8 | >100% |
| | H | None | Absent | Present | Made | 2 | >100% |

Figure 11:
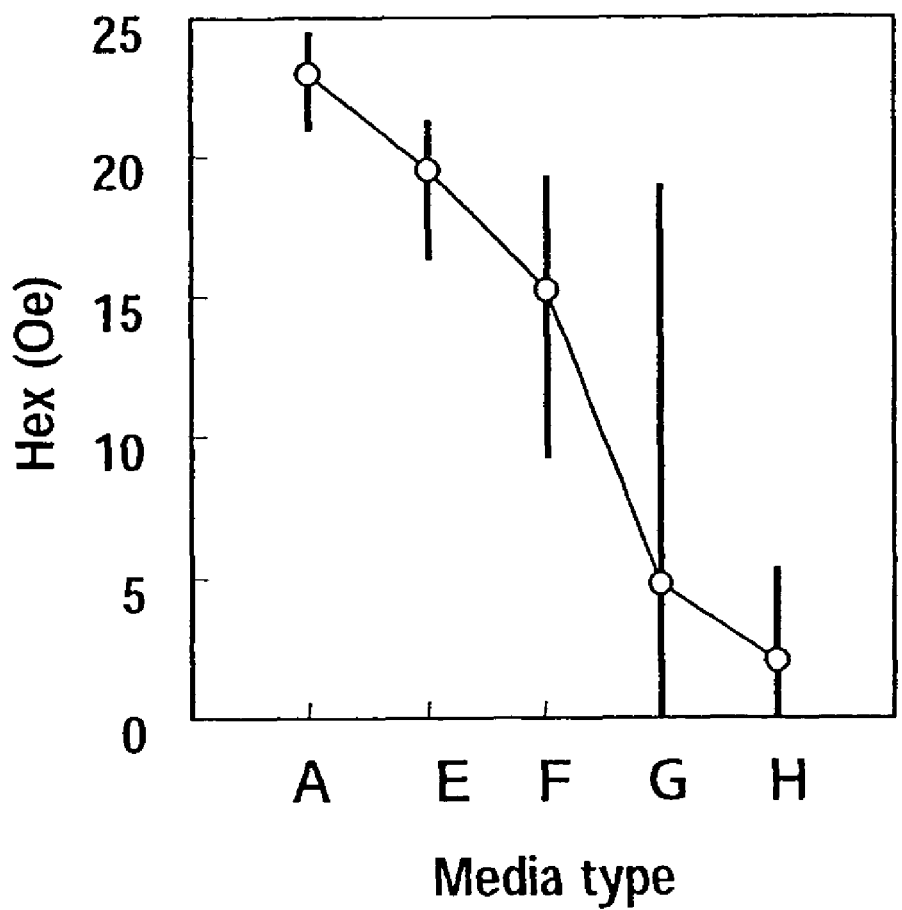
FIG. 11 is a relationship between the medium in an embodiment of the present invention and the antiferromagnetic coupling magnetic field Hex value.

FIG. 11 shows a relationship between each of the above media and the ferromagnetic coupling magnetic field Hex that works between the first and second amorphous soft magnetic layers. In FIG. 11, variations found at the 32 different places of each medium were also shown.

The medium A in this second embodiment obtained the maximum Hex value and the Hex value was found to be distributed less throughout the disk, that was only about 17%. On the other hand, in the media E and F that were cooled in the magnetic field, the Hex value was smaller than that of the medium A and the positional distribution was large. The most effective method found for obtaining a large Hex value for a medium was to cool the medium in the magnetic field after the first amorphous soft magnetic layer was formed.

The medium G cooled while no magnetic field was applied thereon in the deposition process (3) obtained almost the same Hex value as that of the medium F cooled in the magnetic field in the deposition process (3). However, the Hex value of the medium G was varied significantly within 0 to 190, so that the antiferromagnetic coupling between the layers was found to be lost partially.

On the other hand, the first and second amorphous soft magnetic layers were found to be strongly exchange-coupled with each other in the medium H that was not cooled at all.

Figure 12:
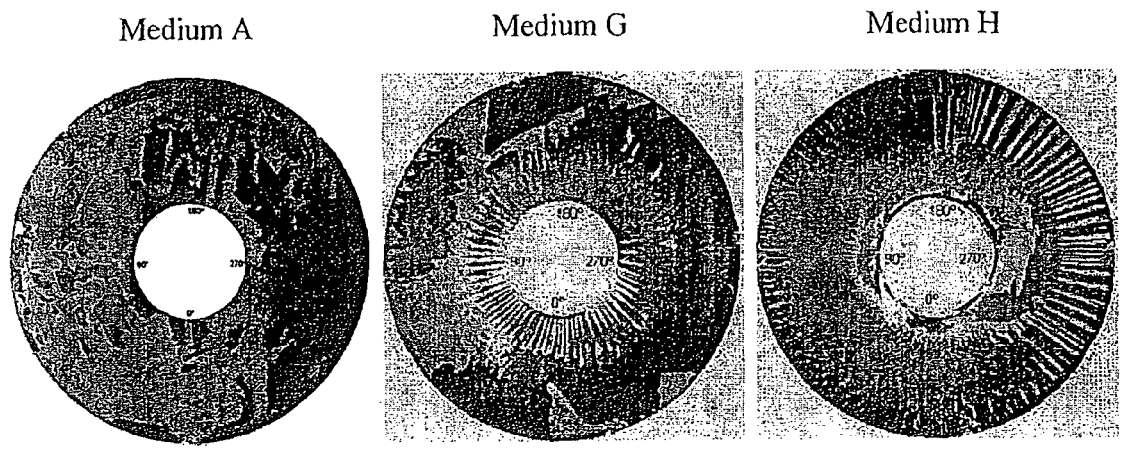
FIG. 12 is a magnetic domain structure of the medium A in an embodiment of the present invention, as well as that of the second amorphous soft magnetic layer of each of the media G and H in comparative examples.

FIG. 12 shows a result of observation of the magnetic domain structures of the second amorphous soft magnetic layers of the media A, G, and H with use of an optical surface analyzer. The intermediate layer 16 and the perpendicular layer 17 were not formed in any of the samples used here.

In the medium A in this embodiment, the magnetic domain of the second amorphous soft magnetic layer was found to include regions with different contrasts. Thus, the magnetic domain came to have a multi-domain structure. The magnetic domain was comparatively large and stable in state.

On the other hand, in each of the media G and H, the magnetic domain image had a magnetic domain wall extended in the radial direction of the substrate as seen in a single layer film. It was also found from the magnetic domain structure that the antiferromagnetic coupling between the first and second amorphous soft magnetic layers was lost partially.

As described above, the soft magnetic underlayer formed according to the manufacturing method of the present invention was apparently effective to suppress both spike noise and amplitude modulation of read signals, since the magnetic field of the antiferromagnetic coupling that worked between the first and second amorphous soft magnetic layers was large and the positional distribution of the magnetic field was not so large.

Third Embodiment

Figure 13:
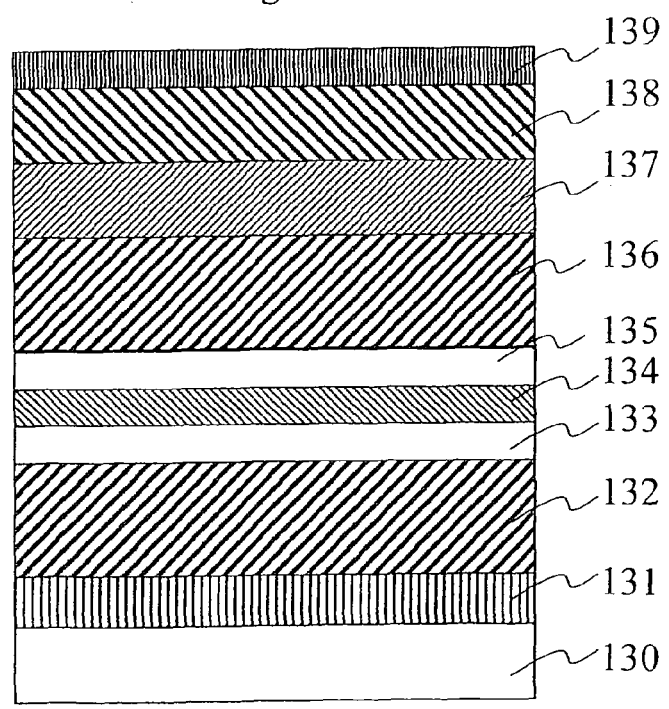
FIG. 13 is another layer configuration of the perpendicular recording medium in an embodiment of the present invention.

FIG. 13 shows a layer configuration of a perpendicular magnetic recording medium in this third embodiment. On a 2.5 type glass substrate 130 were formed an amorphous layer 131, a first amorphous soft magnetic layer 132, a first ferromagnetic layer 133, a nonmagnetic layer 134, a second ferromagnetic layer 135, and a second amorphous soft magnetic layer 136 successively with use of the sputtering method. The medium was then cooled down to about 100° C. in the magnetic field. After that, an intermediate layer 137, a perpendicular recording layer 138, and a protective layer 139 were formed successively on the substrate 130.

While the medium was cooled, the magnetic field was oriented from outer periphery to inner periphery in the radial direction of the disk substrate and the magnetic field magnitude was controlled within 4 kA/m to 8 kA/m on the disk substrate.

Table 4 shows both Ar gas pressure and film thickness of each target used for forming each layer of the medium in this third embodiment. A coat of a lubricant obtained by thinning a per fluoro alkyl poly-ethere material by a fluoro carbon material was applied on the lubricant layer.

Figure 14:
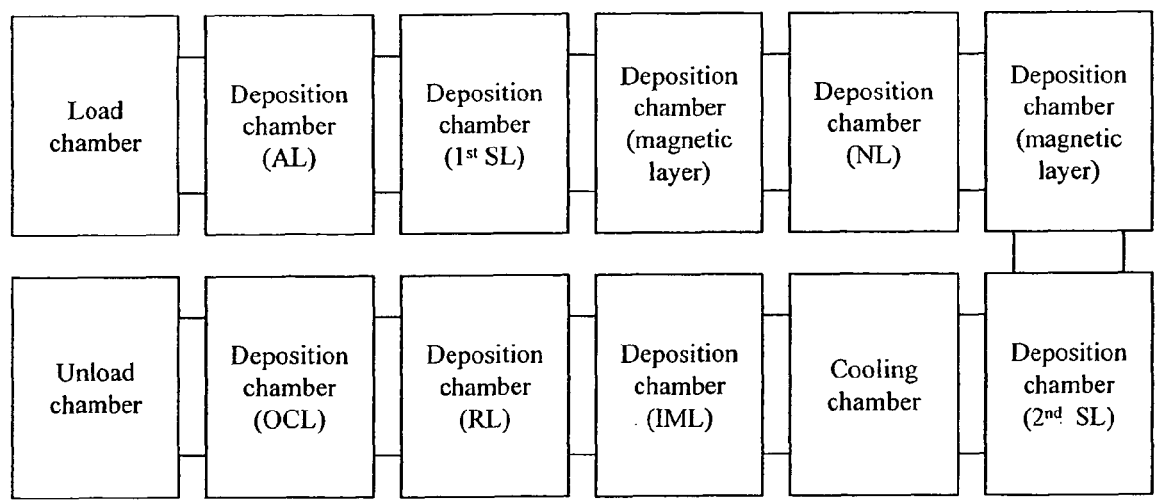
FIG. 14 is a schematic block of a film depositing apparatus for manufacturing the medium in an embodiment of the present invention.

FIG. 14 shows a schematic sequence of processes of a depositing apparatus for manufacturing the medium in this third embodiment. The depositing apparatus in this third embodiment comprises a substrate load chamber, an amorphous layer deposition chamber, a first amorphous soft magnetic layer deposition chamber, a ferromagnetic layer deposition chamber, a nonmagnetic layer deposition chamber, a second amorphous soft magnetic layer deposition chamber, a substrate cooling chamber for cooling each substrate while applying a magnetic field in the radial direction of the substrate, an intermediate layer deposition chamber, a recording layer deposition chamber, a protective layer deposition chamber, and a substrate unload chamber.

The cooling timing in this third embodiment provided between the second amorphous soft magnetic layer 136 deposition process and the nonmagnetic layer 137 deposition process is identical to the deposition process (3) shown in FIG. 10 in the second embodiment.

TABLE 4

| | Target composition | Ar gas pressure (Pa) | Film thickness (nm) |
|---|---|---|---|
| Amorphous layer 131 | $CrTi_{50}$ | 1 | 20 |
| First amorphous soft magnetic layer 132 | $Fe_{57}Co_{31}B_{12}$ | 0.5 | 75 |
| Ferromagnetic layers 133, 135 | $Co_{90}Fe_{10}$ | 1 | 2 |
| Nonmagnetic layer 134 | Ru | 0.6 | 0.8 |
| | $Ru_{70}Fe_{30}$ | 0.6 | 1 |
| Second amorphous soft magnetic layer 136 | $Fe_{57}Co_{31}B_{12}$ | 0.5 | 75 |
| Intermediate layer 137 | Ta/Ru | 2 | 1/18 |
| Recording layer 138 | $CoCr_{13}Pt_{17}$—$SiO_2$ | 2 | 16 |
| Protective layer 139 | Carbon | 1 | 5 |

The magnetic curve of the soft magnetic underlayer in this embodiment denotes a step-like shape having a stable magnetization level within the magnetic field including the zero field just as in the first embodiment if a magnetic field is applied in the radial direction of the disk substrate.

Table 5 shows results of the evaluation of the media I and J examined in this third embodiment, the strength of the antiferromagnetic coupling magnetic field that functions between the first and second amorphous soft magnetic layers of the medium D examined in the first embodiment, as well as the evaluation of both spike noise and amplitude modulation of read signals.

The Hex value of the ferromagnetic coupling magnetic field of each of the media I and J as shown in Table 5 denotes a value equivalent to that of the medium D in the first embodiment. When the Hex values of the media A and F of the second embodiment are compared with each other, the Hex value is reduced from 23 Oe to 15 Oe when the cooling timing in the cooling process is changed from (1) to (3) in FIG. 10.

In each of the media I and J in this third embodiment, the Hex value was not reduced even when the cooling timing in the cooling process was set after the second amorphous soft magnetic layer was formed just as in (3) in FIG. 10. This means that the CoFe/Ru/CoFe three-layer film or RuFe layer is formed stably between the first and second amorphous soft magnetic layers. In other words, the medium in this third embodiment is improved for the thermal resistance at the interface between the nonmagnetic layer and the ferromagnetic layer or at the interface between the amorphous soft magnetic layer and the nonmagnetic layer.

TABLE 5

|  | Medium | Constitution of soft magnetic underlayer, parenthesized number means film thickness (unit: nm) | Hex (Oe) | Spike noise | Amplitude modulation |
|---|---|---|---|---|---|
| This embodiment | D | FeCoB(75)/Ru(0.8)/FeCoB(75) | 43 | Absent | Not made |
|  | I | FeCoB(75)/CoFe(2)/Ru(0.8)/CoFe(2)/FeCoB(75) | 45 | Absent | Not made |
|  | J | FeCoB(75)/RuFe(1)/FeCoB(75) | 48 | Absent | Not made | with a RuFe layer. The thermal resistance of the media I and J is apparently improved more than that of the medium D.

In this third embodiment, the cooling process was provided between the second amorphous soft magnetic layer deposition process and the intermediate layer deposition process. However, the cooling process may also be provided between the intermediate layer deposition process and the recording layer deposition process if the intermediate layer is to be deposited at a high temperature and the recording layer is deposited at a low temperature. If a heating process is required after the recording layer deposition, the cooling process may be provided between the recording layer heating process and the protective layer deposition process.

The method for manufacturing the perpendicular recording medium of the present invention can set a cooling process timing after depositing the second amorphous soft magnetic layer or perpendicular recording layer in the medium manufacturing process. Particularly, the manufacturing cost of the perpendicular recording medium can be reduced if a high deposition temperature of the intermediate layer or perpendicular recording layer is required.

Fourth Embodiment

In this fourth embodiment, evaluation was made for both spike noise and amplitude modulation of read signals using a medium B described in the first embodiment, a medium K that used NiCrZr for the amorphous layer and a medium L that used AlTi for the amorphous layer while they were configured just as the medium B, as well as a medium X in which the first amorphous soft magnetic layer was formed directly on the substrate as a comparative example, and a medium Y in which the first amorphous soft magnetic layer was formed on a crystalline NiCr layer. Table 6 shows the evaluation results. While read signal amplitude modulation was recognized in the medium X in which the soft magnetic underlayer was formed directly on the substrate, the spike noise was suppressed in each of the evaluated media.

TABLE 6

|  | Medium | Constitution of soft magnetic underlayer, parenthesized number means film thickness (unit: nm) | | Spike noise | Amplitude modulation |
|---|---|---|---|---|---|
| This embodiment | B | NiTaZr(30) | CoTaZr(75)/Ru(0.8)/CoTaZr(75) | Absent | Not made |
|  | K | NiCrZr(30) | CoTaZr(75)/Ru(0.8)/CoTaZr(75) | Absent | Not made |
|  | L | AlTi(30) | CoTaZr(75)/Ru(0.8)/CoTaZr(75) | Absent | Not made |
| Comparative example | X | — | CoTaZr(75)/Ru(0.8)/CoTaZr(75) | Absent | Made |
|  | Y | NiCr(30) | CoTaZr(75)/Ru(0.8)/CoTaZr(75) | Absent | Not made |

Figure 15:
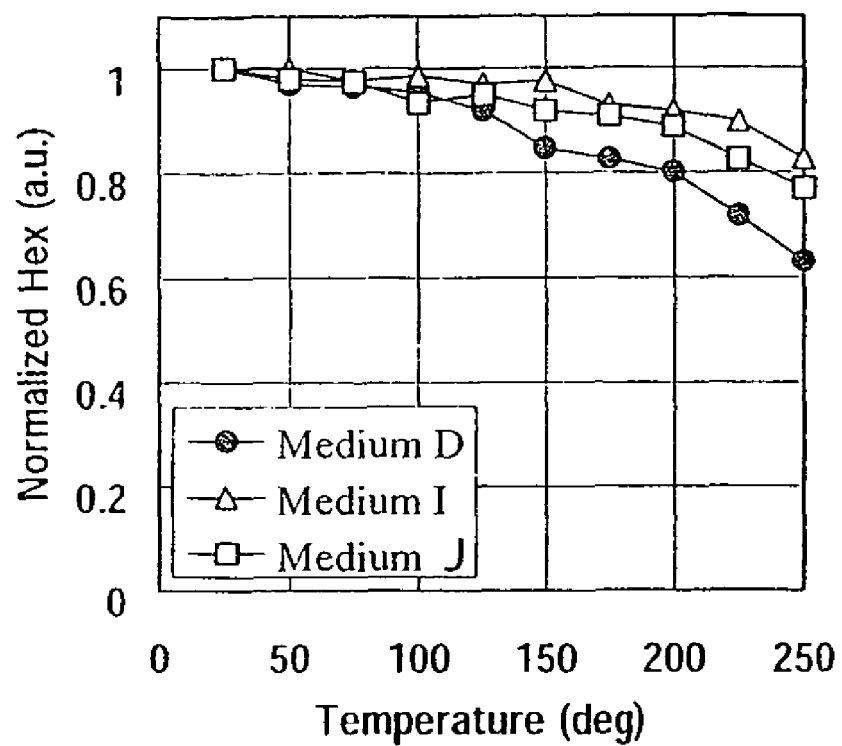
FIG. 15 is a graph for denoting how the antiferromagnetic coupling magnetic field Hex temperature changes.

FIG. 15 shows results of the evaluation of the thermal resistance of each of the media I and J in this third embodiment, as well as the medium D in the first embodiment.

Hex values are normalized by the value at as-deposited. The Hex value decreases in proportion to an increase of the environmental temperature. At 250° C., the falling rate of the Hex value is 0.62 for the medium D, 0.82 for the medium I in which a CoFe/Ru/CoFe three-layer film is provided between the first and second amorphous soft magnetic layers, and about 0.79 for the medium J in which the Ru layer is replaced After that, a corrosion resistance test was performed for the medium K in this embodiment, as well as for the media X and Y in the comparative examples. The test conditions were set as follows; the humidity was 100%, the temperature was 60° C., and the test period was one week.

Figure 16:
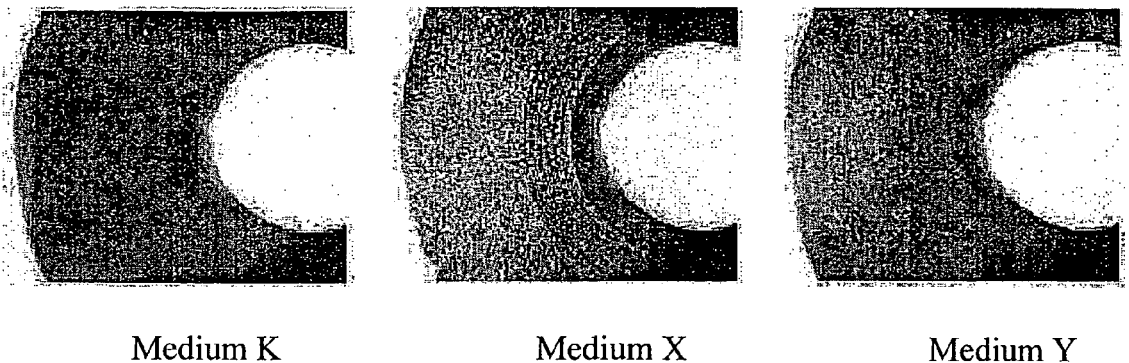
FIG. 16 illustrates the surface of the medium K in an embodiment of the present invention, as well as those of the media X and Y in examples for comparison after the corrosion resistance evaluation.

FIG. 16 shows images of the substrate surfaces of the tested media observed with use of an optical surface analyzer. Each white region denotes corrosion on the medium surface. In the case of the medium X in which the soft magnetic layer is formed directly on the substrate, corrosion was recognized throughout the disk surface. On the contrary, the corrosion resistance was improved for the medium for which a crystallized layer or amorphous layer was formed between the substrate and the soft magnetic underlayer. The medium B in which the soft magnetic underlayer was formed on an amorphous layer was found to have the highest corrosion resistance. The same effect as that of the medium K was also recognized in the medium B or medium L in this embodiment.

After that, information was written/read in/from each of the above media. A single pole head having a track width of 0.25 μm was used for writing and a GMR head having a shield gap of 0.08 μm and a track width 0.22 μm was used for reading.

Then, an error rate evaluation was made for the signal read back waveform through an EEPR4 type signal processing circuit and an error rate of about $10^{-6}$ was obtained from each of the media B, K, and L and an error rate of about $10^{-5}$ were obtained from each of the media X and Y under the areal recording density of 7.75 gigabits per square centimeter. As a result, it was found that the error rate for the medium in this embodiment in which the soft magnetic underlayer was formed on an amorphous layer was lower by a single digit than that of each of other media.

As is well known, the record/write separation type head is configured by a main pole, a recording coil, an auxiliary pole/upper shield, a GMR element, and a lower shield.

Figure 17:
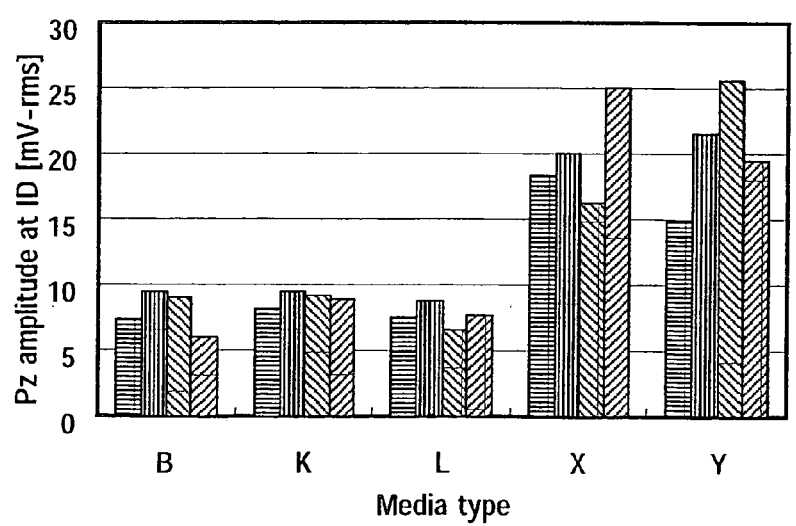
FIG. 17 is a graph for describing the fly ability of the medium in an embodiment of the present invention.

Four pieces were manufactured for each of the above media and evaluated for the fly ability. FIG. 17 shows the results of the evaluation. It was confirmed that each medium fly ability was improved when the soft magnetic underlayer was formed on an amorphous layer.

Figure 18:
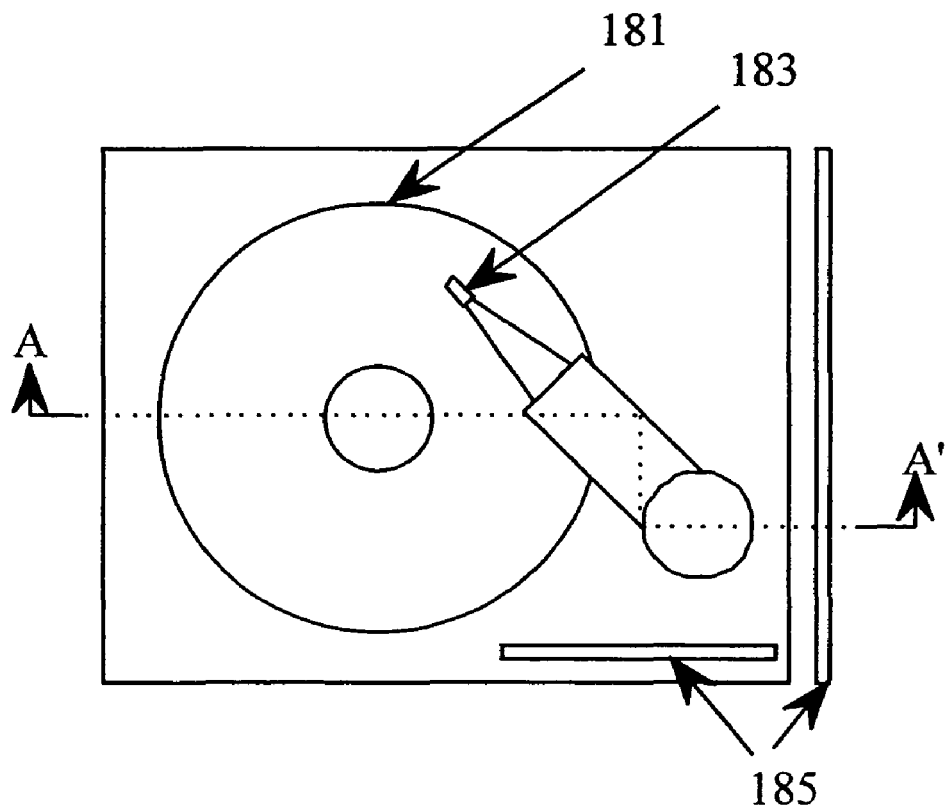
FIG. 18(a) is an explanatory top view of the magnetic recording/reproducing apparatus in an embodiment of the present invention and FIG. 18(b) is its cross sectional view of the apparatus at the A-A' vertical line.
Figure 18:
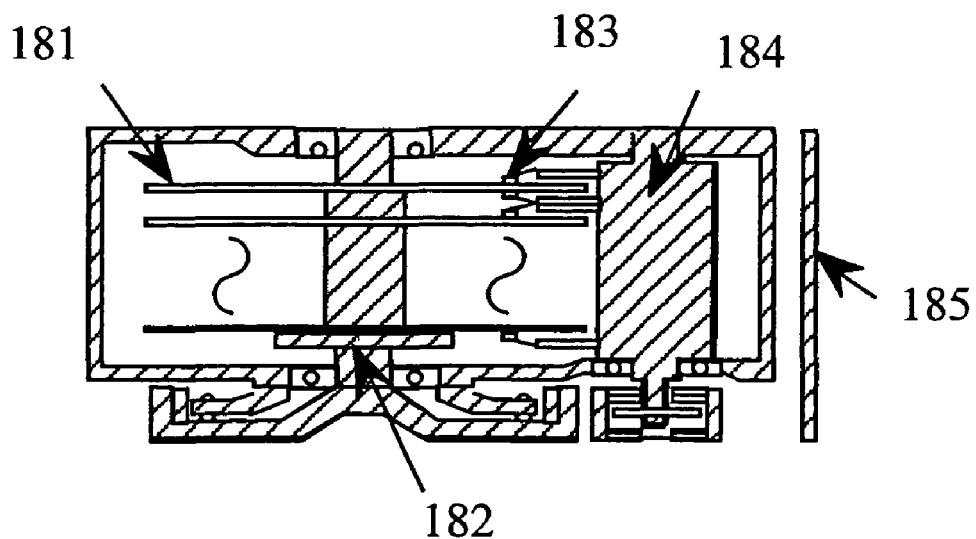

Next, a description will be made for an embodiment of a general magnetic recording/reproducing apparatus of the present invention with reference to FIG. 18. This apparatus comprises a perpendicular magnetic recording medium 181, a motor element 182 for rotating the medium, a magnetic head 183, and its driving means 184, and a write/read channel 185 provided for the magnetic head 183. The magnetic head 183 is a write/read separation type one provided on a magnetic head slider. The track width of the single pole type recording head is 0.22 μm and the shield-to-shield separation of the magnetic head is 0.08 μm, and the track width is 0.22 μm. Then, the medium A in the first embodiment was loaded in the apparatus and the read/write characteristics were evaluated at a head fly distance of 10 nm. At a temperature range of 10° C. and 50° C., the performance of the medium satisfied the read/write characteristic requirement of 7.75 gigabits per square centimeter.

Fifth Embodiment

The magnetic recording/reproducing apparatus in this fifth embodiment was configured just as the apparatus in the fourth embodiment. However, the apparatus in this fifth embodiment used a high sensitivity element that made good use of the tunneling magnetoresistance for the read head, then the medium A described in the first embodiment was loaded in the apparatus for the recording/reproducing evaluation at a head fly distance of 8 nm. As a result of the evaluation, the 14-gigabit longitudinal recording density read/write characteristics per square centimeter were satisfied enough within a measurement range of 10° C. to 50° C. As is well known, the high sensitivity element that used the magnetic tunneling effect used in this evaluation was configured by an upper electrode, an antiferromagnetic layer, a pinned layer, an insulating layer, a free layer, and a lower electrode.

It is to be understood that the above description is intended to be illustrative and not restrictive. Many embodiments will be apparent to those of skill in the art upon reviewing the above description. The scope of the invention should, therefore, be determined not with reference to the above description, but instead should be determined with reference to the appended claims alone with their full scope of equivalents.

What is claimed is:

1. A perpendicular magnetic recording medium including a perpendicular recording layer formed over a substrate with a soft magnetic underlayer therebetween,
   wherein said perpendicular magnetic recording medium further includes an amorphous layer or nano-crystalline layer formed directly above said substrate and directly below said soft magnetic underlayer;
   wherein said soft magnetic underlayer includes first and second amorphous soft magnetic layers, and a nonmagnetic layer formed between said first and second amorphous soft magnetic layers; and
   wherein said first and second amorphous soft magnetic layers are given uniaxial magnetic anisotropy in a radial direction of said substrate respectively and are coupled with each other antiferromagnetically;
   wherein said amorphous layer or nano-crystalline layer comprises a NiTaZr layer,
   wherein said amorphous layer or nano-crystalline layer includes an alloy that contains at least two or more types Al, Ti, Cr, Co, Hf, Si, and B metal elements.

2. The perpendicular magnetic recording medium according to claim 1;
   wherein said medium further includes a first ferromagnetic layer between said first amorphous soft magnetic layer and said nonmagnetic layer and a second ferromagnetic layer between said second amorphous soft magnetic layer and said nonmagnetic layer.

3. A perpendicular magnetic recording medium including a perpendicular recording layer formed over a substrate with a soft magnetic underlayer therebetween;
   wherein said medium further includes an amorphous layer or nano-crystalline layer formed directly above said substrate and directly below said soft magnetic underlayer;
   wherein said soft magnetic underlayer includes first and second amorphous soft magnetic layers and a nonmagnetic layer formed between said first and second amorphous soft magnetic layers;
   wherein said first and second amorphous soft magnetic layers are given uniaxial magnetic anisotropy in a radial direction of said substrate respectively; and
   wherein a magnetization curve of said soft magnetic underlayer measured by applying a magnetic field to said substrate in the radial direction has a step-like shape containing a magnetization level stable within a magnetic field that includes a zero field while an absolute value of a switching field of which level is to be changed from negative field side saturation magnetization to said stable magnetization is almost the same as an absolute value of a switching field of which level is to be changed from positive field side saturation magnetization to said stable magnetization level;
   wherein said amorphous layer or nano-crystalline layer comprises a NiTaZr layer,
   wherein said amorphous layer or nano-crystalline layer includes an alloy that contains at least two or more types of Al, Ti, Cr, Co, Hf, Si, and B metal elements.

4. The perpendicular magnetic recording medium according to claim 3, wherein said first and second amorphous soft magnetic layers are coupled antiferromagnetically.

5. The perpendicular magnetic recording medium according to claim 3,
wherein said medium further includes a first ferromagnetic layer between said first amorphous soft magnetic layer and said nonmagnetic layer and a second ferromagnetic layer between said second amorphous soft magnetic layer and said nonmagnetic layer.

6. A perpendicular magnetic recording medium including a perpendicular recording layer formed over a substrate with a soft magnetic underlayer therebetween,
wherein said medium further includes an amorphous layer or nano-crystalline layer formed directly above said substrate and directly below said soft magnetic underlayer;
wherein said soft magnetic underlayer includes first and second amorphous soft magnetic layers and a nonmagnetic layer formed between said first and second amorphous soft magnetic layers;
wherein said first and second amorphous soft magnetic layers are coupled with each other antiferromagnetically; and
wherein a differential value of a magnetization curve of said soft magnetic underlayer measured by applying a magnetic field to said substrate in a radial direction thereof has two peaks when the state of said applied magnetic field is changed from saturation magnetization to a reversed saturation magnetization thereof;
wherein said two peaks are almost symmetrical about a zero field and one of the peaks of said differential value of said magnetization curve assumed when the state of said applied magnetic field is changed from positive or negative saturation magnetization to zero and the other peak of said differential value of said magnetization curve assumed when the state of said applied magnetic field is changed from zero to positive or negative saturation magnetization come to lie one upon another;
wherein said amorphous layer or nano-crystalline layer comprises a NiTaZr layer,
wherein said first and second amorphous soft magnetic layers are given uniaxial anisotropy in the radial direction of said substrate respectively,
wherein said amorphous layer or nano-crystalline layer includes an alloy that contains at least two or more types of Al, Ti, Cr, Co, Hf, Si, and B metal elements.

7. The perpendicular magnetic recording medium according to claim 6,
wherein said medium further includes a first ferromagnetic layer between said first amorphous soft magnetic layer and said nonmagnetic layer and a second ferromagnetic layer between said second amorphous soft magnetic layer and said nonmagnetic layer.

8. A magnetic recording/reproducing apparatus including:
a perpendicular magnetic recording medium;
an actuator to drive said perpendicular magnetic recording medium in a recording direction;
a magnetic head having a write element and a read element;
a mechanism to move said magnetic head relatively with respect to said perpendicular magnetic recording medium; and
a read/write channel for writing/reading back signals to/from said magnetic head;
wherein said perpendicular magnetic recording medium includes a perpendicular recording layer formed over a substrate with a soft magnetic underlayer therebetween and an amorphous layer or nano-crystalline layer formed directly above said substrate and directly below said soft magnetic underlayer;
wherein said soft magnetic underlayer includes first and second amorphous soft magnetic layers and a nonmagnetic layer formed between said first and second amorphous soft magnetic layers; and
wherein said first and second amorphous soft magnetic layers are given uniaxial anisotropy in the radial direction of said substrate respectively and coupled with each other anti ferromagnetically;
wherein said amorphous layer or nano-crystalline layer comprises a NiTaZr layer,
wherein said amorphous layer or nano-crystalline layer includes an alloy that contains at least two or more types of Al, Ti, Cr, Co, Hf, Si, and B metal elements.

9. The apparatus according to claim 8,
wherein said medium includes a first ferromagnetic layer between said first amorphous soft magnetic layer and said nonmagnetic layer and a second ferromagnetic layer between said second amorphous soft magnetic layer and said nonmagnetic layer.

10. The apparatus according to claim 8,
wherein a write element of said magnetic head is formed as a single-pole type head and a read element of said magnetic head is formed as a sensitive device that makes use of magnetoresistance or tunneling magnetoresistance.

* * * * *